(12) United States Patent
Platus

(10) Patent No.: US 8,132,773 B1
(45) Date of Patent: Mar. 13, 2012

(54) PASSIVE THERMAL CONTROL OF NEGATIVE-STIFFNESS VIBRATION ISOLATORS

(75) Inventor: David L. Platus, Santa Monica, CA (US)

(73) Assignee: Minus K. Technology, Inc., Inglewood, CA (US)

( * ) Notice: Subject to any disclaimer, the term of this patent is extended or adjusted under 35 U.S.C. 154(b) by 0 days.

(21) Appl. No.: 12/903,954

(22) Filed: Oct. 13, 2010

(51) Int. Cl.
*F16M 1/00* (2006.01)
(52) U.S. Cl. .......................................... 248/618; 248/638
(58) Field of Classification Search .................. 248/618, 248/619, 620, 621, 623, 603, 632, 638, 678; 267/140.5, 36.1
See application file for complete search history.

(56) References Cited

U.S. PATENT DOCUMENTS

| | | | |
|---|---|---|---|
| 4,328,648 A * | 5/1982 | Kalpins | 52/167.4 |
| 4,757,982 A * | 7/1988 | Andra et al. | 267/219 |
| 5,040,764 A * | 8/1991 | Dubois | 248/635 |
| 5,178,357 A | 1/1993 | Platus | |
| 5,310,157 A | 5/1994 | Platus | |
| 5,370,352 A | 12/1994 | Platus | |
| 5,549,270 A | 8/1996 | Platus | |
| 5,669,594 A | 9/1997 | Platus | |
| 5,794,909 A | 8/1998 | Platus | |
| 5,833,204 A | 11/1998 | Platus | |
| 7,598,652 B2 * | 10/2009 | Kornbluh et al. | 310/309 |
| 2010/0109219 A1 * | 5/2010 | Melz et al. | 267/140.15 |

* cited by examiner

*Primary Examiner* — Ramon Ramirez
(74) *Attorney, Agent, or Firm* — Fulwider Patton LLP; Thomas H. Majcher, Esq

(57) ABSTRACT

A passive thermally responsive element (TRE) is used to eliminate or substantially reduce the sensitivity of the axial (vertical) position and axial (vertical) natural frequency of a negative-stiffness vibration isolator to changes in temperature. The TRE will compensate for the inherent thermal sensitivity of the isolator without this added element. The TRE can be a thermally responsive spring that produces forces in response to temperature changes to keep the isolator at or near its ideal equilibrium operating position in order to control the equilibrium position and also to maintain the low natural frequency characteristic of the negative-stiffness vibration isolator.

20 Claims, 11 Drawing Sheets

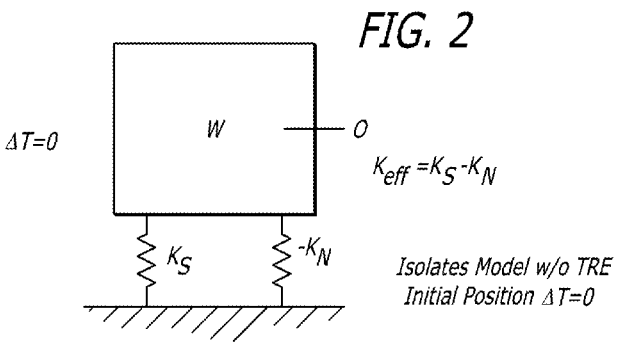

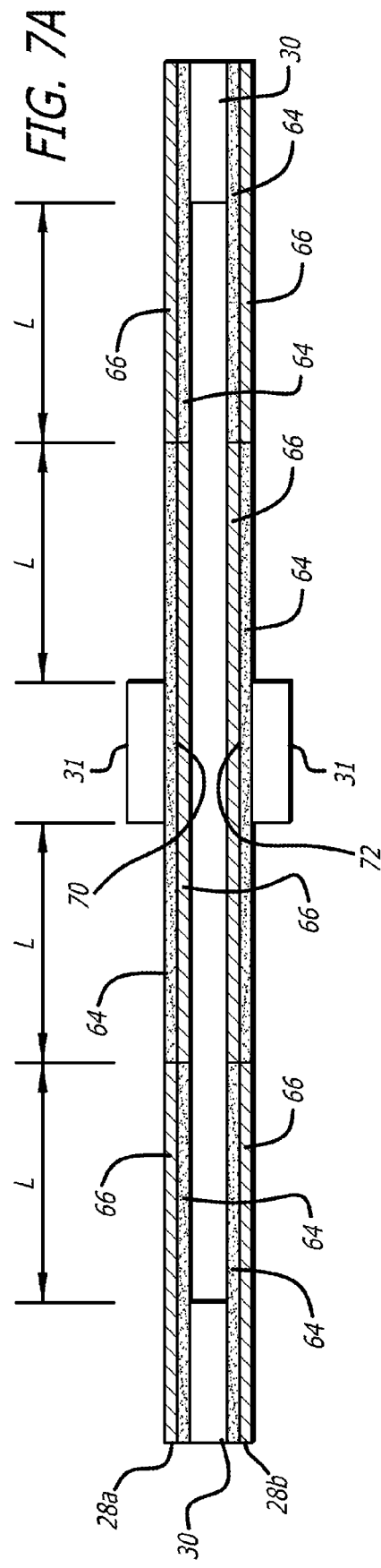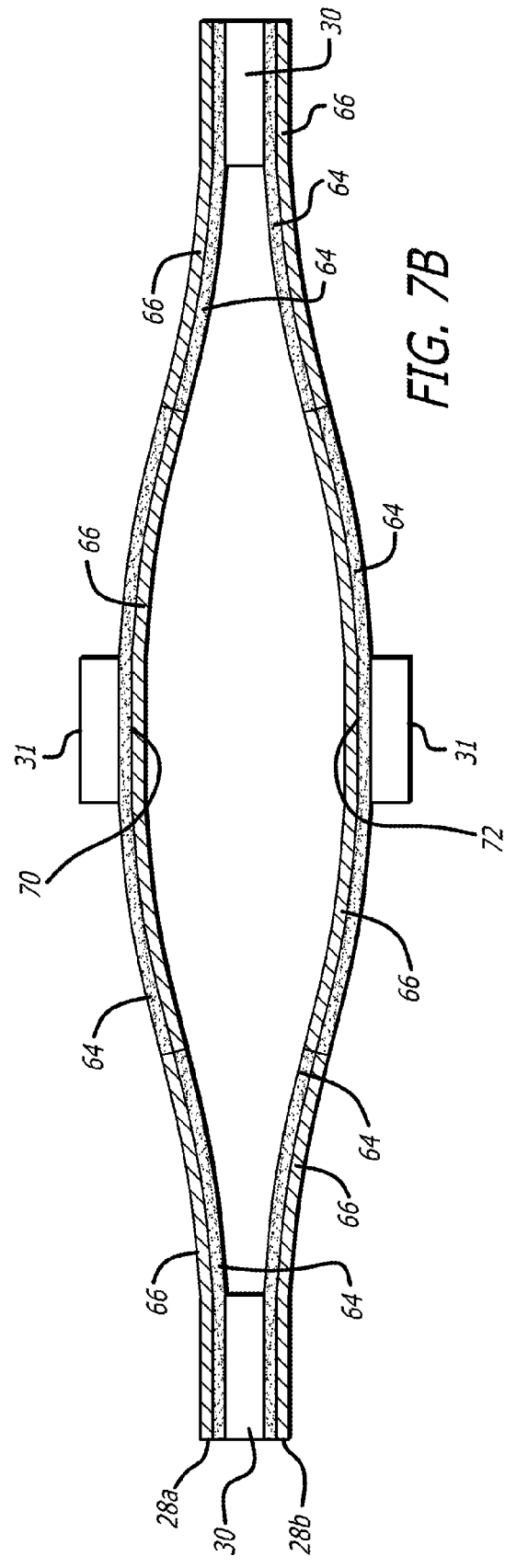

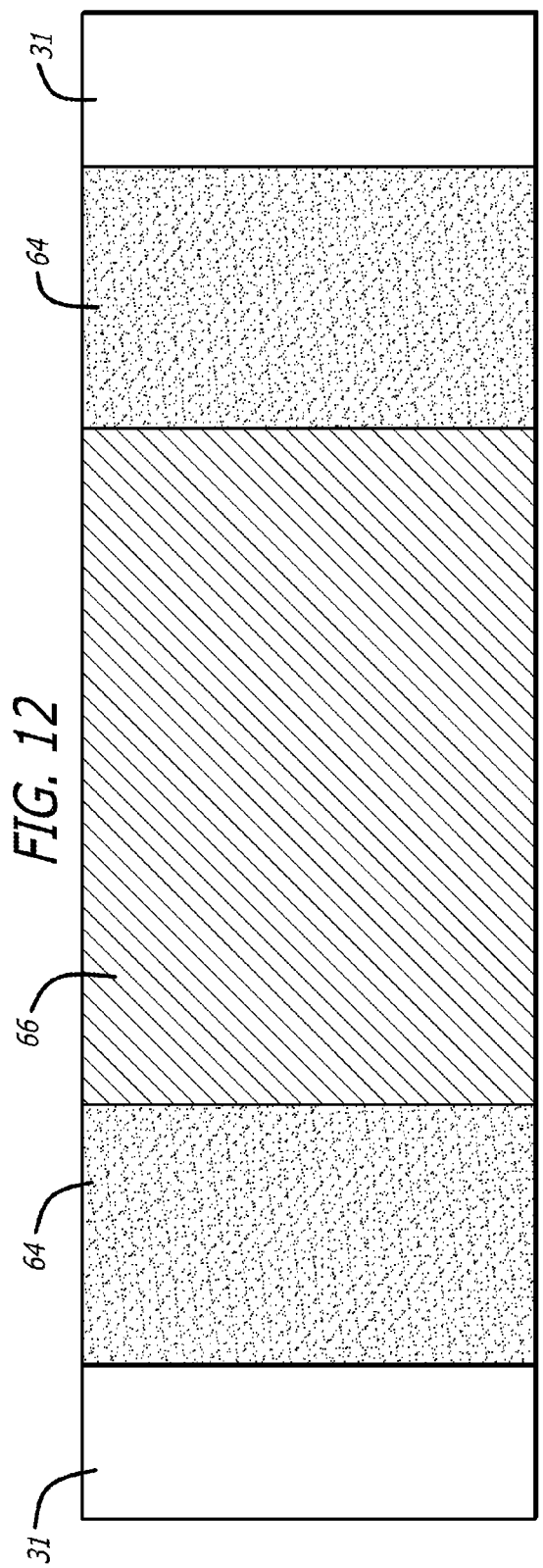
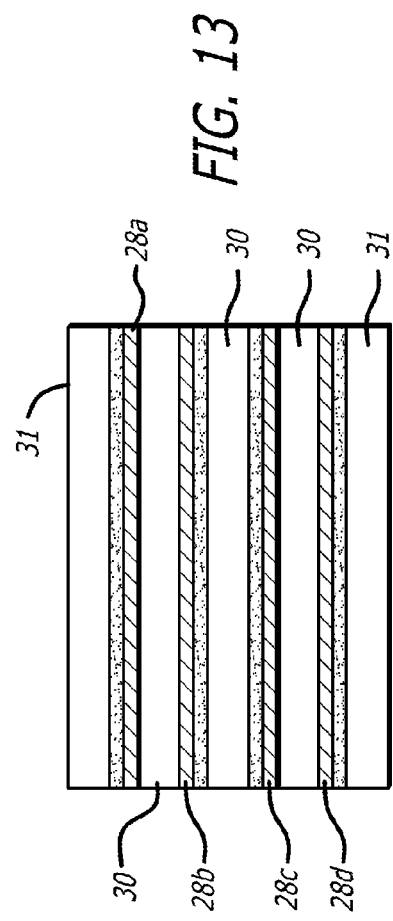

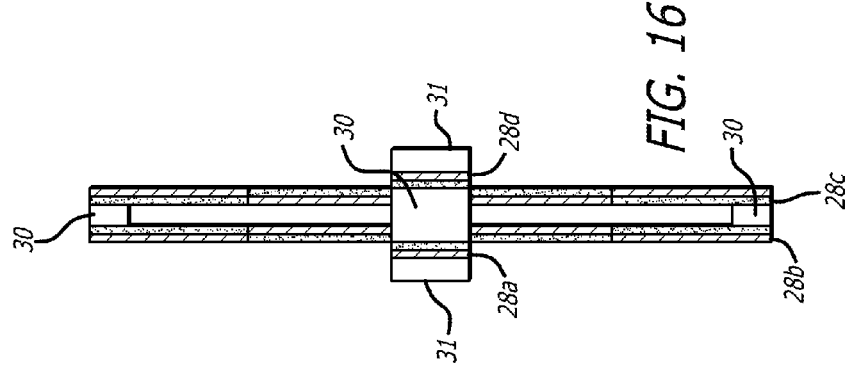
FIG. 16
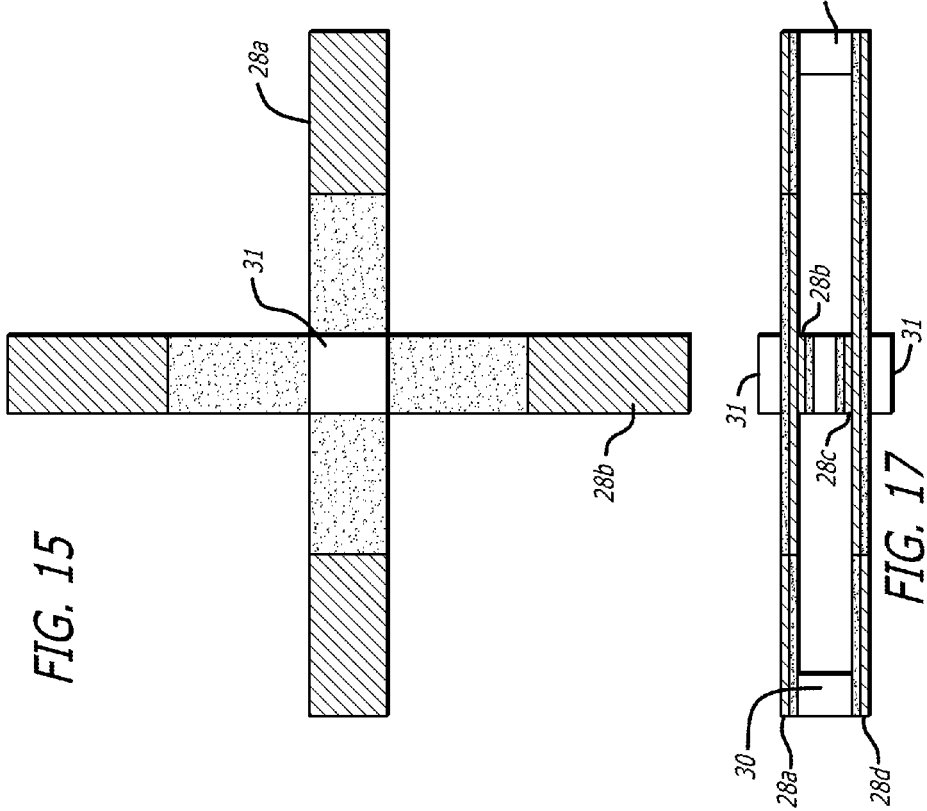
FIG. 15
FIG. 17

PASSIVE THERMAL CONTROL OF NEGATIVE-STIFFNESS VIBRATION ISOLATORS

BACKGROUND OF THE INVENTION

This invention relates generally to suspension systems and methods for isolating and reducing the transmission of vibratory motion between an object and a base and, more particularly, to a passive means for eliminating or substantially reducing the sensitivity of the axial position and natural frequency of a negative-stiffness vibration isolator to changes in ambient temperature.

The problems caused by unwanted vibration on equipment, devices and processes that are extremely motion sensitive have been widely researched and numerous solutions to prevent or reduce the transmission of vibration motion have been proposed and developed. Many of the devices designed to reduce the transmission of unwanted vibration between an object and its surroundings, commonly called vibration isolators or suspension devices, have utilized various combinations of elements including resilient pads made from a variety of materials, various types of mechanical springs, and pneumatic devices. There are, however, shortcomings and disadvantages associated with these particular prior art isolation systems which prevent them from obtaining low system natural frequencies and from limiting resonant responses to low values while providing high isolation performance at higher frequencies.

These shortcomings and disadvantages of prior art systems were addressed through the development of novel vibration isolation systems, devices, and methods for retrofitting existing vibrating systems, described in my U.S. Pat. No. 5,530,157, entitled "Vibration Isolation System" issued May 10, 1994; U.S. Pat. No. 5,370,352, entitled "Damped Vibration System" issued Dec. 6, 1994; U.S. Pat. No. 5,178,357, entitled "Vibration Isolation System" issued Jan. 12, 1993; U.S. Pat. No. 5,549,270, entitled "Vibration Isolation System" issued Aug. 27, 1996; U.S. Pat. No. 5,669,594, entitled "Vibration Isolation System" issued on Sep. 23, 1997; and U.S. Pat. No. 5,833,204, entitled "Radial Flexures, Beam-Columns and Tilt Isolation for a Vibration Isolation System" issued on Nov. 10, 1998, which are all hereby incorporated by reference in their entirety in this present application.

The particular vibration isolation systems described in the above-identified patents, and which could be utilized in connection with the present invention, provide versatile vibration isolation by exhibiting low stiffness in an axial direction (generally the direction of the payload weight) and any direction substantially transverse to the axial direction (generally a horizontal direction). The vibration isolation system may include a tilt-motion isolator for providing isolation in all six degrees of freedom, three translations and three rotations. The particular systems utilize a combination of unidirectional or bidirectional isolation subassemblies that can be connected together in series fashion to provide omnidirectional isolation. Each isolator is designed to isolate either the axial or the transverse component of any vibratory translation to effectively isolate vibrations along, or about, any directional axes. In subsequent discussions, an axial-motion isolator may also be referred to as a vertical-motion isolator, and the system of axial-motion isolators may also be referred to as a vertical-motion isolation system. Similarly, a transverse motion isolator may be referred to as a horizontal-motion isolator, and the system of transverse-motion isolators may be referred to as a horizontal-motion isolation system. Lastly, a tilt-motion isolator which comprises a mechanism which allows rotations about the tilt axes (pitch and roll) may be referred to as a tilt-motion isolation system.

In the embodiments described in the above-noted patents, the isolator system relies on a particular principle of loading an elastic structure which forms the isolator or a portion of it (the loading being applied by either the supported weight or by an external loading mechanism) to approach the point of elastic instability of the elastic structure. This loading of the structure to approach this point of elastic instability, also referred to as the "critical buckling load" of the structure, causes a substantial reduction of either the vertical or horizontal stiffness of the composite isolator to create an isolation system that has low stiffness in the vertical direction and in any horizontal direction, and increases the damping inherent in the structure. While stiffness is greatly reduced, the isolator still retains the ability to support the payload weight.

In the event that the load on the elastic structure is greater than the critical buckling load, the excessive load will tend to propel the structure into its buckled shape, creating a "negative-stiffness" or "negative-spring-rate" mechanism. By combining a negative-stiffness mechanism with a support spring, adjusted so that the negative stiffness cancels or nearly cancels the positive stiffness of the spring, one obtains a device that can be placed at or near its point of elastic instability. The magnitude of the load causing the negative stiffness can be adjusted, creating an isolator that can be "fine tuned" to the particular stiffness desired.

These above-described isolators provide excellent systems for isolating or reducing the transmission of vibratory motion between an object and the base by exhibiting low stiffness, high damping to limit resonant responses of the system, effective isolation at high frequencies and higher isolator resonant frequencies, while being capable of accommodating changing weight loads without significantly degrading isolation system performance. Passive negative-stiffness vibration isolators like the ones described in my above-identified patents provide very low vertical and horizontal natural frequencies, typically 0.5 Hz or less, and thereby provide exceptional vibration isolation at low frequencies and over a range of vibration frequencies encountered in buildings, floors and ground locations, typically in the range of 1 to 80 Hz and higher. Because of the use of negative stiffness to achieve the low vertical stiffness and vertical natural frequency, these isolators are sensitive to changes in temperature that can cause a change in vertical position and that also can result in a change in vertical natural frequency of the isolator. The lowest vertical natural frequencies are achieved when the isolator is at an optimum vertical equilibrium position and, because of nonlinear effects, the frequencies increase as the vertical position changes from this optimum position. Accordingly, these isolators may require manual adjustments, from time to time, following small changes in the weight load on the vertical-motion isolator, or dimensional changes to the structure of the isolator caused by creep of the main support spring or variations in ambient temperature.

Changes in the ambient temperature to which the isolator is subjected to can produce changes in the optimum equilibrium position due to resulting changes in the dimensions of the isolator springs, flexures, and other structures from relative thermal expansions and from changes in mechanical properties such as elastic modulus. Generally, the lower the natural frequency the greater the sensitivity of vertical position and frequency to changes in temperature. Negative-stiffness isolators have simple manual adjustments for correcting for changes in vertical position and some negative-stiffness isolators utilize electro-mechanical auto-adjust systems for sensing changes in vertical position and automatically correcting for them. Therefore, an adjustment apparatus which can continuously and automatically adjust the axial-motion isolator of such an isolation system in response to such variations would further enhance the already high performance of such vibration isolation systems.

My U.S. Pat. No. 5,794,909, incorporated herein in its entirety by reference, discloses such an electro-mechanical automatic adjustment apparatus which virtually eliminates, or greatly reduces, the need for manual adjustment of the isolator. The apparatus disclosed in U.S. Pat. No. 5,794,909 is an active system which requires electronic sensors to sense any change in the isolator position and electronic controls to apply a signal to a component which adjusts the load on a compressed control spring which moves the isolator back to its optimum equilibrium position. However, there are situations where the isolators are not accessible or easily accessible, as when the isolator is placed in vacuum chambers, inside acoustic enclosures, or at remote locations. In some applications, very tight tolerances on isolator vertical position and natural frequency are desirable and sometimes it is not practical to make frequent manual adjustments, particularly in multiple-isolator systems. Too many manual adjustments also could cause dynamic perturbations in the isolation system that would be detrimental to the particular application. Because of these situations, it is desirable to have a passive means for automatically compensating for the inherent temperature sensitivity of negative-stiffness isolators. The present invention satisfies these and other needs.

SUMMARY OF THE INVENTION

The present invention provides a novel passive means for eliminating or substantially reducing the sensitivity of the axial (vertical) position and axial (vertical) natural frequency of a negative-stiffness vibration isolator to changes in temperature. The present invention basically consists of operatively coupling a thermally responsive element (TRE) with an isolator so that the TRE will compensate for the inherent thermal sensitivity of the isolator without this added element. In one preferred embodiment, the TRE is in the form of a thermally responsive spring that produces forces in response to temperature changes to keep the isolator at or near its ideal equilibrium operating position in order to control the equilibrium position and also to maintain the low natural frequency characteristic of the negative-stiffness vibration isolator.

In order to passively compensate for the inherent temperature sensitivity of the isolator and maintain the optimum vertical position and low natural frequency, the TRE is operatively coupled to the isolator by placing it in parallel with the isolator. In one particular embodiment of the present invention, the isolator includes a main support spring, a sprung or floating part of the isolator and a part of the isolator that acts as ground. The TRE would be operatively coupled to this isolator by coupling it between the sprung or floating part of the isolator and the part of the isolator that acts as ground. The TRE adds only a small stiffness to that of the main support spring. The present invention is practical because a relatively stiff support spring is usually used in such an isolator and the negative-stiffness mechanism associated with the isolator removes much of this stiffness so that the effective stiffness of the isolator is small compared with the stiffness of the support spring, typically only a few percent. If a TRE is added to retrofit an existing isolator, its added stiffness can be removed by adding some negative stiffness through a manual negative stiffness adjustment feature of the isolator. Consequently, the TRE must apply relatively small forces to compensate for changes in axial (vertical) position and this can be achieved by practical TREs such as thermally responsive springs.

In order to achieve optimum performance, the vertical-motion isolator should be positioned at, or near, the center of its motion, also referred to as the "null" position or "optimum equilibrium" position. In one preferred embodiment of the present invention, the TRE, in the form of a secondary thermally responsive spring that produces forces in response to temperature changes, is positioned in parallel with the main support spring. In this preferred embodiment, the TRE should be installed so that it is neither compressed nor expanded when the isolator is in its equilibrium position and is subjected to a particular ambient temperature. When the isolator is subjected to variations in ambient temperature, the effective stiffness of the isolator will change slightly, and, without the TRE, would move the isolator out of its preferred optimum equilibrium position. However, the TRE (which is responsive to the temperature change as well) will react to the variation in temperature and provide a small amount of force which will counteract the change in stiffness of the isolator and keep the isolator in its preferred equilibrium position.

All in all, the present invention provides a novel passive apparatus for continuously adjusting an axial (vertical)-motion isolator in a compact and relatively simple arrangement that can be easily incorporated into the isolator or retrofitted to an existing isolator. This apparatus allows the isolator to be continuously adjusted following variations caused by changes in the ambient temperature.

In a preferred embodiment of the present invention, the TRE may take the form of a thermally responsive spring such as a bimetal spring. The size and shape of the spring can be varied in numerous ways to achieve the desired properties. For example, in one particular embodiment of the spring, an assembly of bimetal cantilever beams can be joined and stacked together using spacers to obtain a spring having the desired stiffness, thermal expansion capability, deflection capability and strength needed to complement the isolator. In one particular embodiment, two layers of bimetal beams can be used, although it is possible to vary the number of bimetal beams to form the composite structure. Spacers which separate the various bimetal beams can be used to obtain a desired displacement capability for the composite structure and allow the isolator to operate within its normal range of motion. The bimetal beams can be aligned one over the other or placed in a cross arrangement relative to each other. There are a number of different stacked arrangements which could be implemented to obtain the desired stiffness, thermal expansion capability, deflection capability and strength of the bimetal spring assembly. In some cases, thermally responsive springs utilizing trimetal elements can offer advantages over bimetal elements In one particular embodiment, the thermally responsive spring will expand in height with an increase in temperature. When temperature decreases, the spring will shorten in height. The components forming the spring also could be reversed so that they will contract in height with increase in temperature. The spacers can be made from a variety of materials such as metals, plastics, wood, etc. and joined in different ways such as welding or cementing with various adhesives. The desired properties of the bimetal or trimetal assembly can be obtained by varying a number of parameters, including, but not limited to, the materials used to form the bimetal or trimetal components, the structure, length, width and thickness of the bimetal or trimetal beams, the number of layers in the stack and the size and placement of the spacers. Accordingly, the desired properties of the TRE can be created to accurately allow the TRE to continuously adjust the isolator through variations in the ambient temperature.

Other features and advantages of the present invention will become apparent from the following detailed descriptions, when taken in conjunction with the accompanying drawings which illustrate, by way of example, the principles of the present invention.

BRIEF DESCRIPTION OF THE DRAWINGS

FIG. 2 is a schematic drawing depicting a model of a negative-stiffness vibration isolator with a suspended weight W, the isolator having a support spring stiffness $K_s$ and a negative spring stiffness $-K_N$, where $K_N$ is the magnitude of the negative stiffness, the isolator being at its initial optimum equilibrium position when $\Delta T=0$.

FIG. 3 is a schematic drawing depicting the model of the negative-stiffness vibration isolator of FIG. 2 when the isolator is moved from its optimum equilibrium position when $\Delta T \neq 0$.

FIG. 4 is a schematic drawing depicting a model of a negative-stiffness vibration isolator in which a thermally responsive element has been added to adjust the thermal sensitivity of the isolator, the thermally sensitive element having a stiffness $K_b$ and the isolator being at its initial optimum equilibrium position when $\Delta T=0$.

FIG. 5 is a schematic drawing depicting the model of the negative-stiffness vibration isolator of FIG. 4 when the isolator remains at its initial optimum equilibrium position when $\Delta T \neq 0$.

FIG. 7A is a side elevational view of the thermally responsive spring of FIG. 6 in its unconstrained position when $\Delta T=0$.

FIG. 7B is a side elevational view of the thermally responsive spring of FIG. 6 in its unconstrained position when $\Delta T \neq 0$.

FIG. 12 is a top view of the thermally responsive spring of FIG. 10.

FIG. 13 is an end view of the thermally responsive spring of FIG. 10.

FIG. 15 is a top view of the thermally responsive spring of FIG. 14.

FIG. 16 is side elevational view of the thermally responsive spring of FIG. 14 taken along line 16-16.

FIG. 17 is a side elevational view of the thermally responsive spring of FIG. 14 taken along line 17-17.

DETAILED DESCRIPTION OF THE PREFERRED EMBODIMENTS

Figure 1:
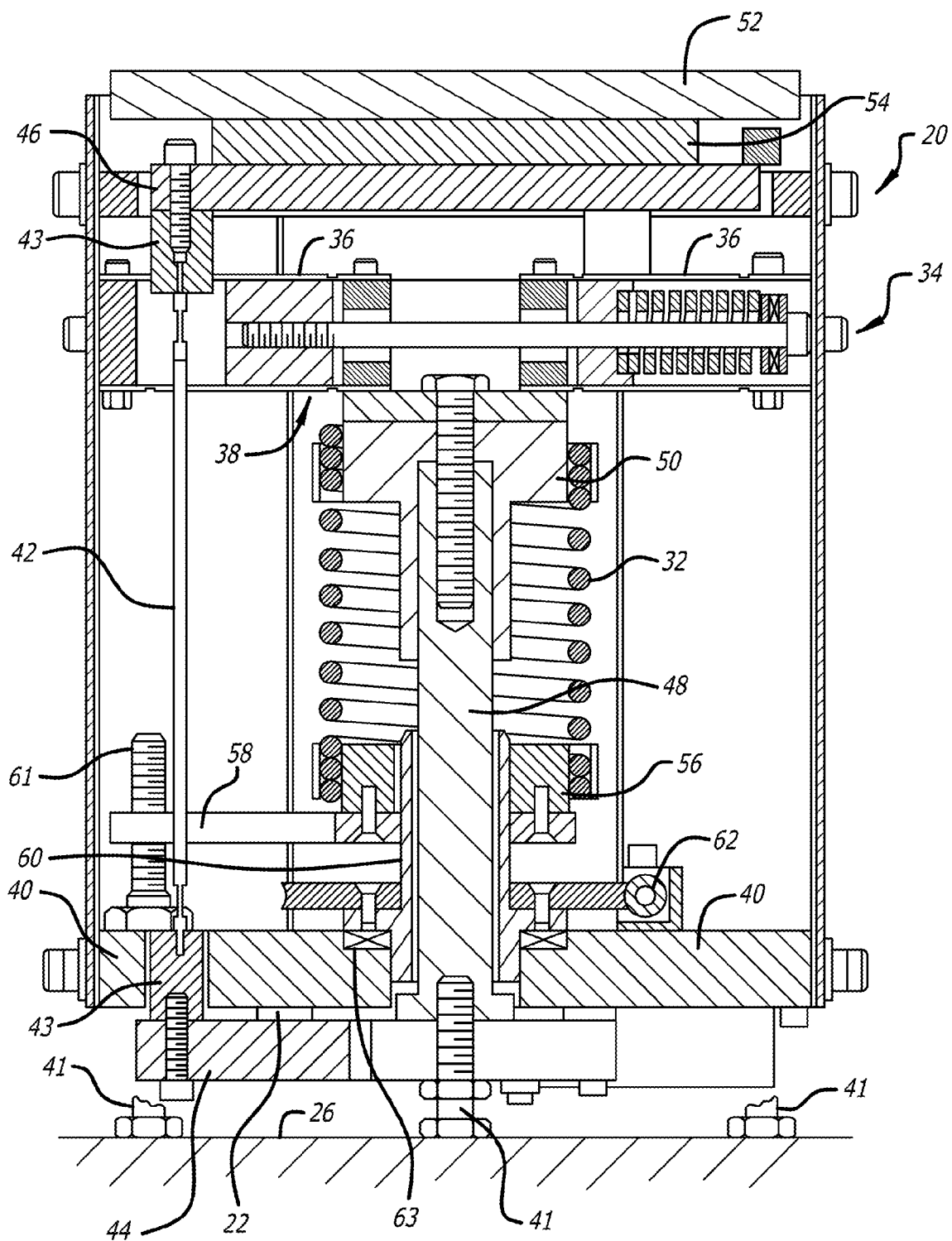
FIG. 1 is a partial cross sectional view of a single negative stiffness vibration isolator equipped with a particular embodiment of a passive thermally responsive element which incorporates features of the present invention.
Figure 6:
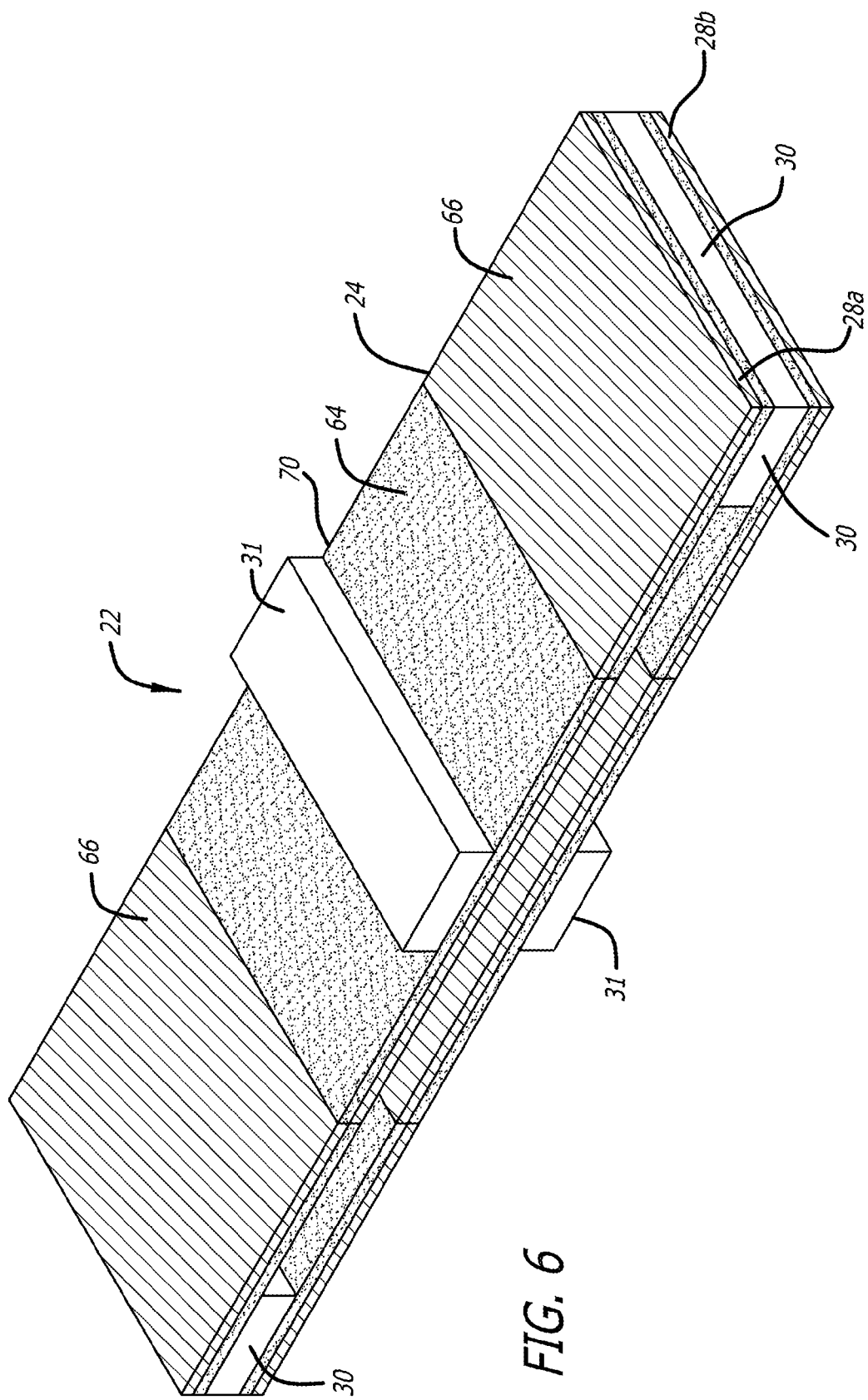
FIG. 6 is a perspective view of one particular embodiment of a thermally responsive element made in accordance with the present invention in the form of a thermally responsive spring.
Figure 8:
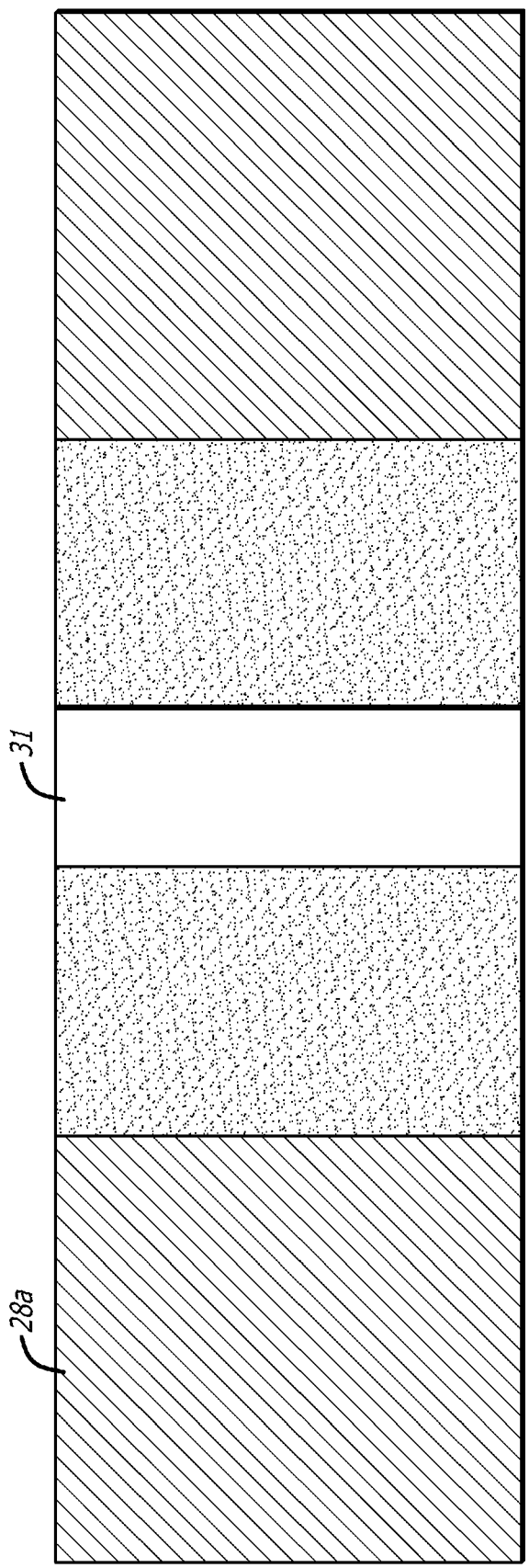
FIG. 8 is a top view of the thermally responsive spring of FIG. 6.
Figure 9:
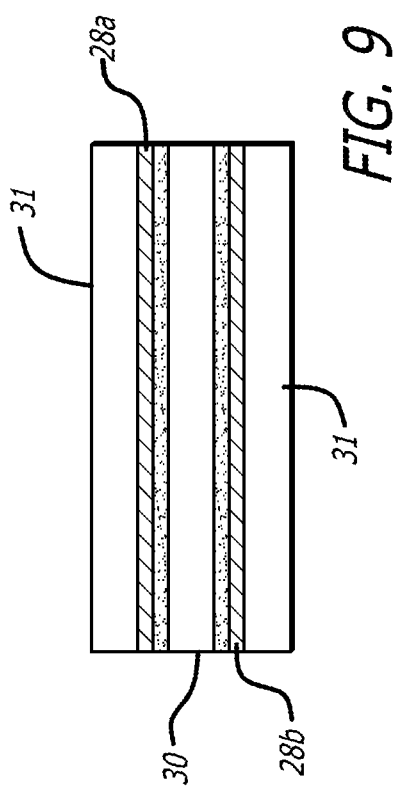
FIG. 9 is an end view of the thermally responsive spring of FIG. 6.
Figure 10:
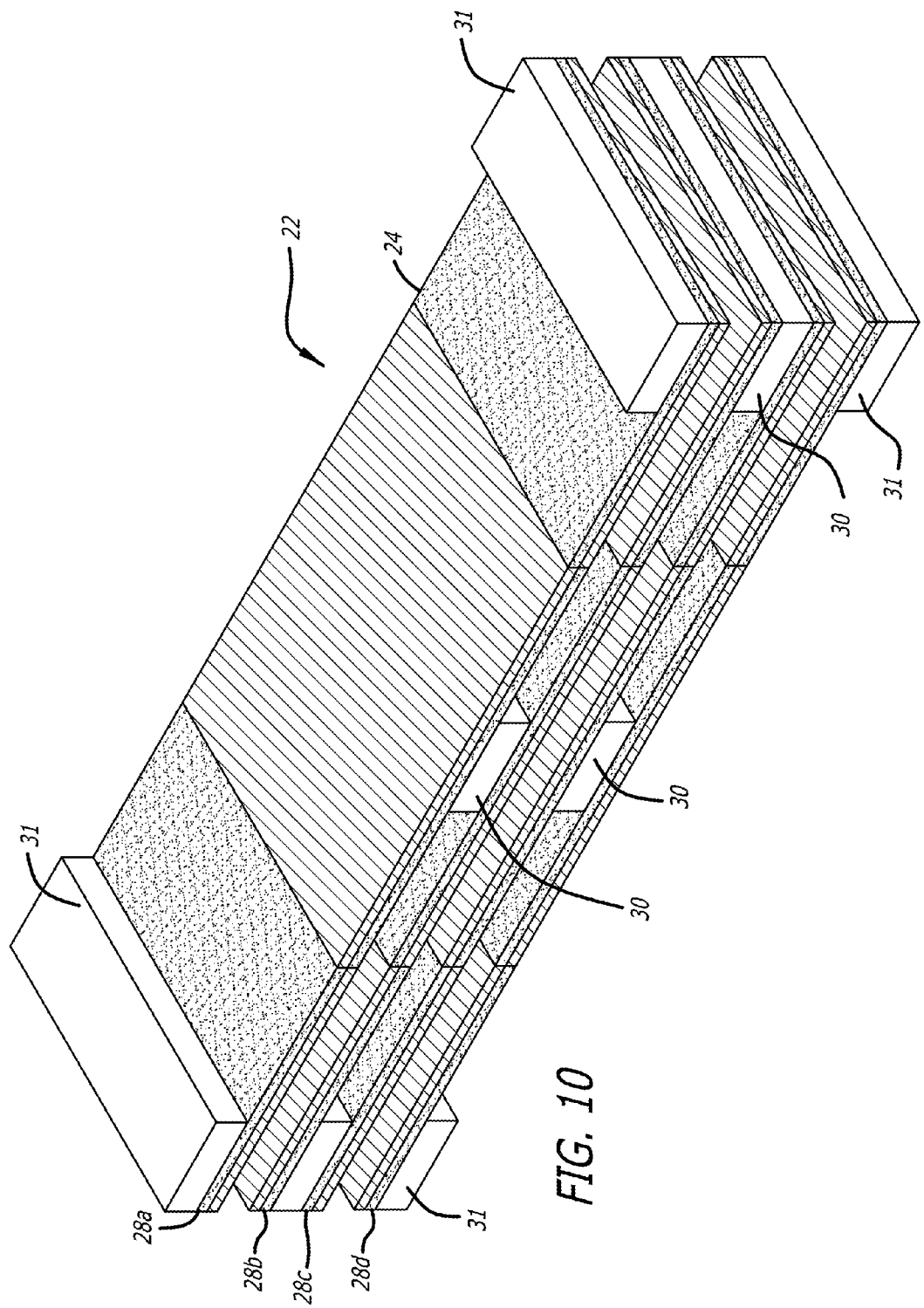
FIG. 10 is a perspective view of another embodiment of a thermally responsive element in the form of another thermally responsive spring made in accordance with the present invention.
Figure 11:
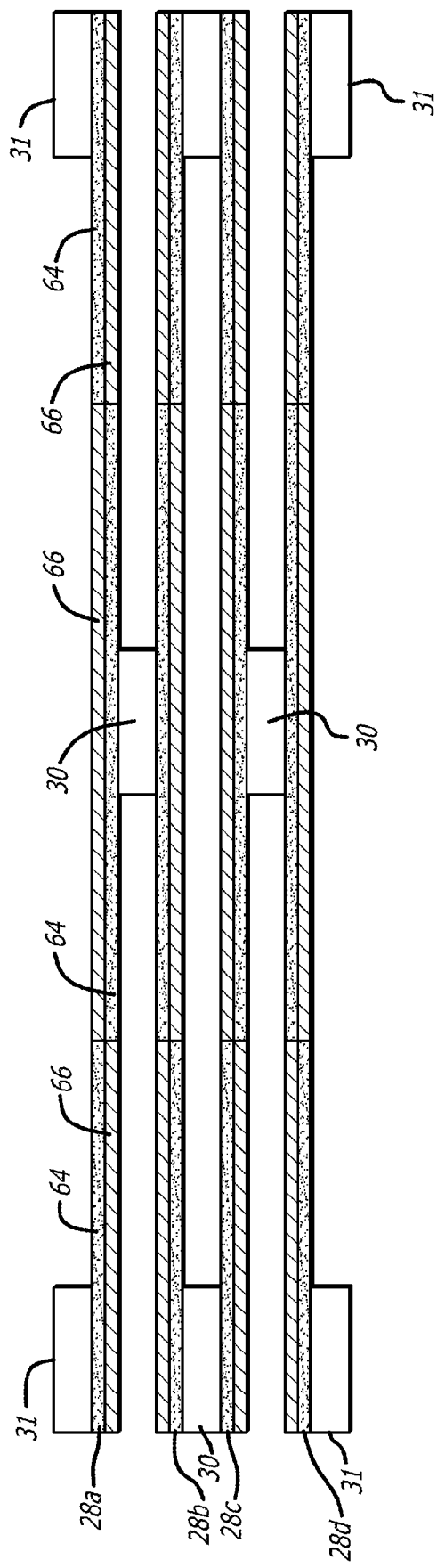
FIG. 11 is a side elevational view of the thermally responsive spring of FIG. 10.
Figure 14:
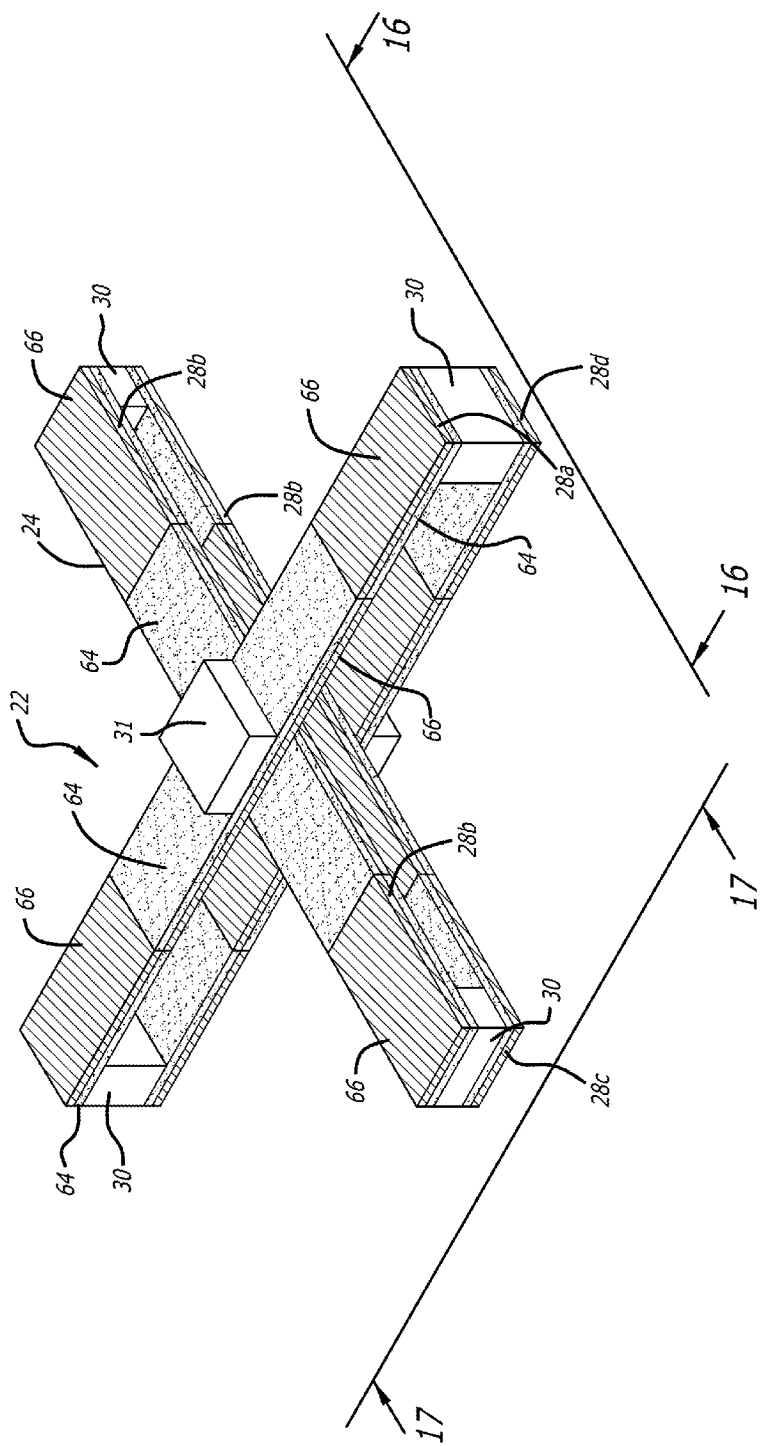
FIG. 14 is a perspective view of another embodiment of a thermally responsive element in the form of a thermally responsive spring made in accordance with the present invention.

As shown in the drawings for purposes of illustration, particular elements embodying the present invention are found on a particular embodiment of a composite isolator shown in FIG. 1. As the present invention is described in detail as applied to the particular isolator shown in FIG. 1, those skilled in the art will appreciate that the present invention also can be used in conjunction with other isolators as well.

The following is a detailed description of the present invention. FIG. 1 illustrates a typical negative-stiffness isolator 20 and one particular form of a TRE 22 in the form of a thermally responsive spring 24 which adjusts the vibration isolator 20 in response to structural changes cause by variations in ambient temperature. The isolator 20 can be a stand alone unit or a part of a vibration isolation system which supports a payload relative to a foundation 26 to reduce the transmission of omnidirectional vibrations between the payload and foundation 26. The particular thermally responsive spring 24 used with the isolator of FIG. 1 is more clearly shown in FIGS. 6-9. The spring 24 is formed from assemblies made from a number of stacked bimetal beams 28 and spacers 30, which are described in greater detail below.

The isolator 20 consists of a main support spring 32 which supports the weight of the payload and a negative-stiffness mechanism 34 which includes compressed horizontally-oriented flexures 36 that behave as a negative spring that removes stiffness from the support spring 32, thereby providing a low vertical stiffness and low vertical natural frequency while still supporting the payload weight. There is an optimum equilibrium position of the isolator, typically midway between upper and lower stops that define the vertical range of motion of the isolator. When the position changes from this optimum equilibrium position due to a temperature change, the stiffness and vertical natural frequency of the isolator changes as well which can affect the performance of the isolator.

The isolator 20 shown in FIG. 1 is very similar to the isolators described in my U.S. Pat. Nos. 5,669,594 and 5,833,204. The isolator 20 basically includes a vertical-motion isolator operatively connected vertically in series with a horizontal-motion isolator which is operatively connected vertically in series with a tilt-motion isolator. The vertical-motion, horizontal-motion and tilt-motion isolators are generally arranged in the same configuration as that shown in U.S. Pat. Nos. 5,669,594 and 5,833,204. Therefore, only general reference will be made to the particular elements making up the vertical-motion, horizontal-motion and tilt-motion isolators, since the particular operation of these individual isolators which form the isolator can be found in the above-identified U.S. patents.

The vertical-motion isolator includes the main support spring 32 which is operatively connected a center hub assembly 38 and a base plate 40 that is connected to the foundation 26 by three leveling screws 41. The negative-stiffness mechanism 34 is shown connected to the center hub assembly 38 to cancel stiffness from the support spring 32. This negative-stiffness mechanism includes radially compressed flexures 36 which provide the negative-stiffness to the center hub assembly 38 and the main support spring 32.

Briefly, the horizontal-motion isolator is comprised of three flexible beam columns 42 (only one of which is shown in FIG. 1) in the form of thin cylindrical rods that are operatively connected between a lower column plate 44 and an upper column plate 46. The beam columns 42 are press fitted into end fittings 43 which are attached to the upper column plate 46 and to the lower column plate 44 utilizing screws or other fastening devices. The lower column plate 44 is connected to a stiff support shaft 48 which is in turn connected to an upper spring support 50 which forms part of the center hub assembly 38. This particular stiff support shaft 48 provides a relatively rigid connection between the top of the vertical-motion isolator and the bottom of the horizontal-motion isolator. The upper column plate 46 which forms the top of the horizontal-motion isolator is connected to a top mounting plate 52 through a tilt pad 54 which acts as a tilt-motion isolator. In the isolator 20 shown in FIG. 1, the tilt pad 54 can be made from a flexible rubber-like material.

An anti-rotation device prevents torsional deformation of the main support spring 32 as the lower spring support 56 is raised and lowered to accommodate changes in weight load on the isolator. The anti-rotation device includes a plate 58 that is clamped to the lower spring support 56 that is attached to a threaded support tube 60 that is supported on a thrust bearing 63 that is contained in a recess in the base plate. The anti-rotation plate 58 has a slot that engages a post 61 that prevents rotation of plate 58 and support spring 32 as the lower spring support 56 is raised or lowered. A worm gear assembly (not shown in great detail in FIG. 1) is provided which includes a worm gear attached to the support tube 60 which engages a worm that is mounted on the adjusting screw shaft 62 found in a housing that is attached to the base plate 40. The worm is secured to the adjusting screw shaft 62 with a pin or similar fastener. The rotation of the screw shaft 62 raises or lowers the lower spring support 56 to accommodate changes in weight load on the isolator.

Referring still to FIG. 1, a TRE 22 embodying features of the present invention is shown as it is attached to the isolator 20. The TRE 22 is specifically shown as a thermally responsive spring 24 which is shown in greater detail in FIGS. 6-9 and is described in greater detail below. In order to passively compensate for the inherent temperature sensitivity of the isolator and maintain the optimum vertical position and low natural frequency, the thermally responsive spring, for example, is placed in parallel with the isolator by inserting it between a sprung or floated part of the isolator and a part of the isolator that acts as ground. In the specific embodiment shown in FIG. 1, this thermally responsive spring is operatively coupled to the isolator such that it is in parallel with the main support spring 32 of the isolator. Accordingly, this spring 24 is coupled to a floating part of the isolator, namely, the lower column plate 44, which is constrained to move only vertically, and the base plate 40 which represents ground. This invention is practical because a relatively stiff support spring is used and the negative-stiffness mechanism removes much of this stiffness so that the effective stiffness of the isolator is small compared with the stiffness of the support spring, typically only a few percent. If a TRE is added to retrofit an existing isolator its added stiffness can be removed by adding some negative stiffness through the manual negative stiffness adjustment feature of the isolator. Consequently, the TRE must apply relatively small forces to compensate for changes in the isolator stiffness and this can be achieved by practical TREs such as, but not limited to, thermally responsive springs such as bimetal and trimetal springs.

The basic principles of the present invention and the manner in which the TRE functions can be better explained by referring to FIGS. 2-5. Referring initially to FIGS. 2 and 3, a schematic drawing representing a model of the isolator showing a suspended weight W is disclosed. In this model, the TRE has not been added to the system to compensate for thermal fluctuations. The main support spring 32 is shown having a support spring stiffness $K_s$ and the negative stiffness mechanism creates negative spring stiffness which is represented by $-K_N$, where $K_N$ is the magnitude of the negative stiffness. As is shown in FIG. 2, the isolator is at its initial optimum equilibrium position when the isolator is at an initial ambient temperature, which is represented as $\Delta T=0$. The effective stiffness of the isolator is $K_{eff}=K_s-K_N$.

FIG. 3 shows this same isolator when $\Delta T \neq 0$, i.e., the ambient temperature has changed. As can be seen in FIG. 3, the weight W has deflected downward an amount $\delta_I$. The support spring is now exerting a change in force $\Delta F_s$ upward on the weight and the negative stiffness mechanism is exerting a change in force $\Delta F_N$ downward on the weight. Since the system is in equilibrium $\Delta F_s = \Delta F_N$. The thermal sensitivity of the isolator would be $\delta_I/\Delta T$. When $\Delta T \neq 0$, the isolator moves from its initial optimum equilibrium position to a position which changes the stiffness of the isolator along with its low natural frequency. The vibration isolation properties of the isolator will thus change when a change in temperature affects the isolator.

FIG. 4 shows a model of the isolator in which a TRE as been added to cancel the thermal sensitivity. The TRE, for example, the bimetal spring, has stiffness $K_b$ and the negative stiffness of the isolator has been increased to cancel $K_b$ so that the effective stiffness of the isolator $K_{eff}$ is unchanged. The modified isolator is shown at its initial optimum equilibrium position when $\Delta T=0$. The magnitude of the new negative stiffness is define by the equation $K_N'=K_N+K_b$. The TRE has been installed so that it is neither compressed nor extended in the isolator equilibrium position when $\Delta T=0$.

FIG. 5 now represents the isolator when it is subjected to the same temperature change $\Delta T$ that produced the deflection $\delta_I$ in FIG. 3, but now the isolator deflection is unchanged since the thermal sensitivity has been eliminated by the presence of the TRE. The resulting changes in forces on the weight are shown. This illustrates how the stiffness and thermal deflection requirements of the TRE can be determined. $F_b$ is an upward force produced by the TRE and $K_{eff}\delta_I$ is the approximate downward reaction force required to reverse the deflection $\delta_I$ and keep the isolator at or near its initial equilibrium when $\Delta T=0$. Since the system is in equilibrium, $F_b=K_{eff}\delta_I$. $F_b$ is the force produced by the TRE when its thermal expansion is constrained, i.e., $F_b=K_b \delta_b$, where $K_b$ is the stiffness of the TRE and $\delta_b$ is its unrestrained thermal expansion. This gives the relation, $$K_b \delta_b = K_{eff}\delta_I \text{ or } \delta_b/\delta_I = K_{eff}/K_b.$$

Consider for example a 1000 lb capacity isolator with a vertical natural frequency of 0.4 Hz. The effective stiffness $K_{eff}=16.4$ lb/in. Assume, further, that a temperature change $\Delta T=10°$ F. causes the isolator to displace downward an amount $\delta_I=0.06$ in. Testing or analysis can determine this type of thermal sensitivity. The change in vertical position can be measured for a given change in temperature. The thermal sensitivity can be predicted using a finite-element model or other analytic model and adjusting the mechanical properties of the components and the behavior of the isolator with change in temperature.

The relation between the thermal deflection of the TRE and stiffness of the TRE Kb can be determined from the above equation. For example, if $K_b=K_{eff}/2=8.2$ lb/in, then $\delta_b=2$ $\delta_f=0.120$ in or twice the thermal deflection of the isolator. If instead, $K_b=K_{eff}=16.4$ lb/in, the full effective stiffness of the isolator, then $\delta_b=\delta_f=0.060$ in, the thermal deflection of the isolator. In this case the support spring stiffness is cancelled by the negative stiffness produced by the negative-stiffness producing mechanism.

Based on the above example, the required stiffness and thermal deflections for the TRE can be practically achieved with a bimetal or a trimetal spring and various designs are possible. A variety of suitable bimetal elements are available and various configurations can be used such as assemblies of cantilever beams, U-shaped beams, disks, etc., in order to achieve the required stiffness and thermal expansion properties. For use in typical negative-stiffness isolators it is important that the bimetal or trimetal springs can produce the necessary forces and sustain the necessary deflections while maintaining their structural integrity. For a typical 1000 lb capacity isolator as that used in the example, the range of motion can be +/−0.15 in or more. It is also important that there is no friction or "stiction" in the TRE that would prevent the isolator from isolating extremely small vibrations, such as micro inches of motion.

Referring now to FIGS. 6, 7A, 8 and 9, one preferred embodiment of a TRE 22 is shown in the form of a thermally responsive spring 24 in its initial undeformed shape (unconstrained), the way it would be coupled to the isolator in its initial optimal equilibrium position. FIG. 7B shows the TRE 22 as it would appear in its unconstrained, expanded configuration when it is subjected to a temperature change. The particular thermally responsive spring 24 of FIGS. 6-9 utilizes bimetal components which enable the spring 24 to move into different configurations when subjected to thermal changes. In this regard, the spring 24 has the ability to move between an unexpanded position, as is shown in FIG. 7A when $\Delta T=0$, to an expanded position, as shown in FIG. 7B when $\Delta T \neq 0$. The same spring 24 has the ability to compress to a shorter height depending on the particular change in temperature.

The thermally responsive spring 24 includes a top bimetal beam 28a and a bottom bimetal beam 28b which are stacked above each other. Each of these bimetal beams 28a and 28b are attached together using a pair of spacers 30 located near the ends of the beams. These bimetal beams 28a and 28b and spacers 30 will cooperate to achieve the desired stiffness, thermal expansion capability, deflection capability and strength of the thermally responsive spring 24.

Each bimetal beam 28a and 28b is made from high-expansion components 64 and low-expansion components 66 well known in the art. Each bimetal beam 28a and 28b effectively behave as four cantilever beams when subjected to a temperature change. Referring now specifically to FIGS. 7A and 7B, the manner in which the bimetal beams 28a and 28b behave when subjected to a temperature change can be better explained. The length of the "cantilever beam" is identified by the letter L in FIG. 7A. The bottom bimetal beam 28b is likewise made from high-expansion components 64 and low expansion components 66. The bottom bimetal beam 28b is shown having the same effective cantilever lengths L as the top bimetal beam 28a. While the lengths of these effective cantilever beams are shown having the substantially same length L, it should be appreciated that the various lengths shown of the bimetal beams 28a and 28b could be varied, if desired, in order to achieve the necessary properties of the thermally responsive spring 24.

Reference is now specifically made to FIG. 7B which shows how the top bimetal beam 28a moves upwardly when subjected to a temperature change. The bottom bimetal beam 28b, in turn, moves downwardly when subjected to the temperature change. Thus, the composite spring 24 of FIGS. 6-9 will expand in height, as shown in FIG. 7B, with an increase in temperature. In a similar fashion, a decrease in temperature will cause the top bimetal beam 28a to bend downward while the bottom bimetal beam 28b bends upward, causing the spring 24 to shorten in height. It should be appreciated that the placement of these high-expansion and low-expansion components 64 and 66 can be easily reversed so that the bimetal beams 28a and 28b will contract in height with an increase in temperature and expand in height with a decrease in temperature.

Spacers 30 are placed between the top bimetal beam 28a and bottom bimetal beam 28b to maintain these beams together. As can be seen in these figures, the spacers 30 are placed near the outer ends of the bimetal beams. In the particular embodiment shown in these figures, a support block 31 is placed at the center 70 of the top bimetal beam 28a and the center 72 of the bottom bimetal beam 28b. These support blocks 31 would be, in turn, attached to the isolator to operatively couple the thermally responsive spring 24 with the isolator. In the particular embodiment of the isolator shown in FIG. 1, the top and bottom support blocks 31 would be attached to the lower column plate 44 and the base plate 40 respectively, and the high-expansion and low-expansion components 64 and 66 would be reversed so that the bimetal beams 28a and 28b would contract in height with an increase in temperature and expand in height with a decrease in temperature.

The selection and placement of the materials forming the bimetal beams will produce a thermally responsive spring that will lengthen or contract a certain length when subjected to temperature fluctuations. The change in length of the spring, in response to temperature changes, will produce the desired magnitude and direction of the restorative force which will act on the isolator to maintain it in its equilibrium position.

Referring now to FIGS. 10-13, another embodiment of a TRE 22 in the form of a thermally responsive spring 24 is shown. In this particular embodiment, four bimetal beams 28a, 28b, 28c and 28d, rather than two beams, are utilized to create the thermally responsive spring 24. Each of the bimetal beams 28a, 28b, 28c and 28d are constructed and behave like the bimetal beams described above with respect to the embodiment of FIGS. 6-9. Accordingly, there is no need to describe the manner in which these similar components respond to temperature changes.

In this particular embodiment of FIGS. 10-13, spacers 30 are placed at various positions to connect the bimetal beams 28a, 28b, 28c and 28d together. In this particular embodiment, a single spacer 30 is attached to bimetal beams 28a and 28b. A pair of spacers 30 is used to attach bimetal beam 28b to bimetal beam 28c. A single spacer 30 is used to attached bimetal beam 28c to bimetal beam 28d. A pair of support blocks 31 are attached at the ends of the top bimetal beam 28a and the bottom bimetal beam 28d for coupling to the isolator. This particular embodiment also shows that different forms of a TRE can be formed and coupled with an isolator in accordance with the present invention.

FIGS. 14-18 show yet another embodiment of a spring assembly that can be made utilizing multiple bimetal beams 28a, 28b, 28c and 28d. As can be seen in these figures, some of the bimetal beams 28a and 28d are disposed at about an angle of 90° from the other bimetal beams 28b and 28c to create a cross structure. Spacers 30 are again placed at various locations to connect the bimetal beams together to form the composite spring. A support block 31 is placed at the center of the top beam 28a and the bottom beam 28d. This particular composite spring would be operatively connected to the isolator via these top and bottom support blocks. Again, this arrangement shows just one of the many configurations that the bimetal spring can take.

Figure 18:
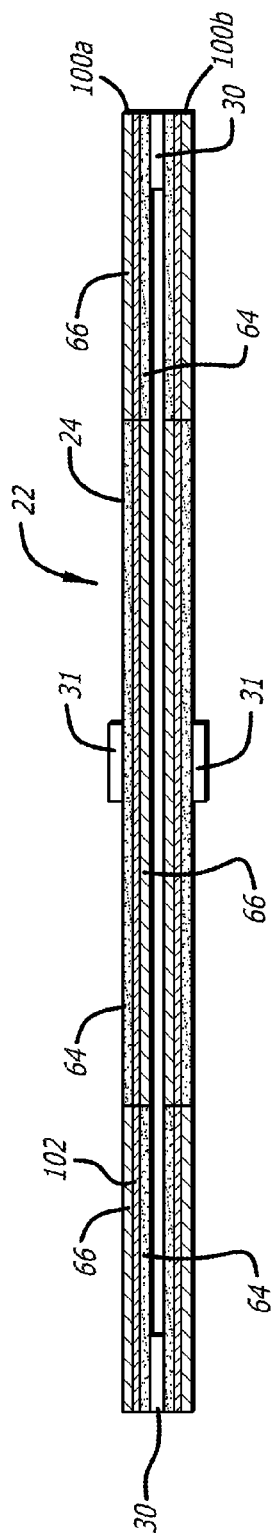
FIG. 18 is a side elevational view of a thermally responsive element spring in the form of a thermally responsive spring.
Figure 19:
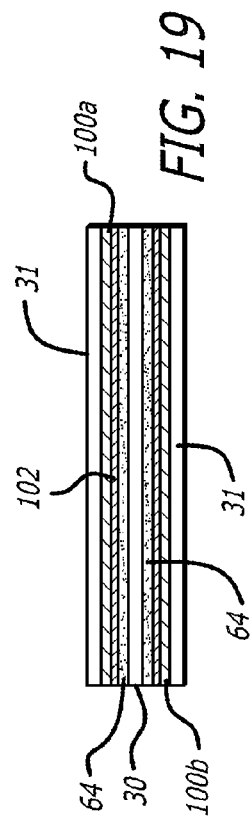
FIG. 19 is an end view of the thermally responsive spring of FIG. 18.

FIGS. 18 and 19 show another embodiment of TRE made in the form of a thermally responsive spring 24 that can be made utilizing a top trimetal beam 100a and a bottom trimetal beam 100b. These trimetal beams, like the bimetal beams, can be selected to obtain the particular bending characteristics needed for particular temperature changes. As can be seen in these figures, each trimetal beam 100a, 100b includes high-expansion materials 64 and low-expansion materials 66, along with a third metal 102. These trimetal beams are formed much the same way as the bimetal beams 28 shown in FIGS. 6-17. Like the bimetal beams disclosed above, the trimetal beams 100a and 100b of FIGS. 18 and 19 creates a structure which behave as four cantilever beams. The particular configuration and positioning of the trimetal beams 100a and 100b, spacers 30 and support blocks 31 can be similar to the structure shown in FIGS. 6-9. Like the bimetal beams, the trimetal beams can be made have effective lengths L that are the same or nearly the same. Alternatively, the effective lengths could be different on each trimetal beam to generate the desired properties of the thermally responsive spring 24. In some cases, due to thermal sensitivity, trimetal components may offer advantages over bimetal components.

The spacers can be made from a variety of materials such as metals, plastics, wood etc. and joined in different ways such as welding or cementing with various adhesives. The desired properties of the bimetal or trimetal spring assembly can be obtained by varying a number of parameters, including, but not limited to, the materials used to form the bimetal or trimetal components, the structure, length, width and thickness of the bimetal or trimetal beams, the number of layers in the stack and the size and placement of the spacers. Accordingly, the desired properties of the TRE can be created to accurately allow the TRE to continuously adjust the isolator through variations in the ambient temperature. While bimetal and trimetal beams are disclosed in the featured embodiments, it is possible to use a number of different shapes to create a suitable TRE. The size and shape of the TRE also can be varied as necessary to achieve the desired physical properties and to fit within the shape of the isolator.

The high-expansion and low-expansion components can be selected from a number of different materials which are well known in the art. For example, the high-expansion material would typically have high flexibility and a high coefficient of thermal expansion compared to the low-expansion component. One suitable high-expansion material is an alloy made from about 72% magnesium, about 18% copper and about 10% nickel. A suitable low-expansion component could be made from an alloy such as Invar which is made from about 36% nickel and 64% iron. Suitable trimetal beams can be commercially purchased. It should be appreciated that still other materials could be used to obtain the desired properties for the TRE. The components for making the thermally responsive springs are generally commercially available and can be purchased from commercial companies such as Polymetallurgical Corporation, North Attleboro, Mass. and Engineered Materials Solutions, Attleboro, Mass.

While particular forms of the invention have been illustrated and described, it will be apparent that various modifications can be made without departing from the spirit and scope of the invention. Accordingly, it is not intended that the invention be limited, except by the attached claims.

I claim:

1. A passive adjustment apparatus for adjusting the thermal sensitivity of an axial-motion isolator which supports an object in an equilibrium position relative to a base and includes a support spring for providing stiffness and force supporting capability in an axial direction operatively connected to a negative-stiffness-producing apparatus for producing negative stiffness in the axial direction to allow the support spring and negative-producing apparatus combine to produce low axial stiffness to suppress the transmission of vibratory motion between the object and base, the passive adjusting apparatus comprising:
   a thermally responsive element operatively coupled with the isolator, wherein thermal variations acting on the isolator and thermally responsive element cause the thermally responsive element to apply a restorative force which acts on the isolator to maintain the isolator at or near its equilibrium position.

2. The passive adjustment apparatus as recited in claim 1, wherein the unconstrained thermally responsive element changes length when subjected to temperature variations.

3. The passive adjustment apparatus as recited in claim 2, wherein the thermally responsive element when constrained produces a particular restorative force depending on its unconstrained change in length.

4. The passive adjustment apparatus as recited in claim 1, wherein the thermally responsive element is a thermally responsive spring.

5. The passive adjustment apparatus as recited in claim 4, wherein the thermally responsive spring includes a plurality of bimetal beams.

6. The passive adjustment apparatus as recited in claim 5, wherein the thermally responsive spring includes a plurality of spacers placed between pairs of bimetal beams.

7. The passive adjustment apparatus as defined in claim 4, wherein thermally responsive spring includes trimetal beams.

8. An axial-motion isolator for supporting an object in an equilibrium position relative to a base while suppressing transmission of vibratory motion between the object and the base, comprising:
   a support spring having force-supporting capability in an axial direction for supporting the object in an equilibrium position relative to a base;
   a mechanism for producing negative stiffness operatively coupled to the support spring, wherein the support spring and negative-stiffness-producing mechanism combine to produce low axial stiffness to suppress the transmission of vibratory motion between the object and base; and
   a thermally responsive element operatively coupled with the isolator, wherein thermal variations acting on the isolator and thermally responsive element cause the thermally responsive element to apply a restorative force which acts on the isolator to maintain the isolator at or near its equilibrium position.

9. The axial-motion isolator as recited in claim 8, wherein the unconstrained thermally responsive element changes length when subjected to temperature variations.

10. The axial-motion isolator as recited in claim 9, wherein the thermally responsive element produces a particular restorative force depending on its unconstrained change in length.

11. The axial-motion isolator as recited in claim 8, wherein the thermally responsive element is a thermally responsive spring.

12. The axial-motion isolator as recited in claim 11, wherein the thermally responsive spring includes a plurality of bimetal beams.

13. The axial-motion isolator as recited in claim 12, wherein the thermally responsive spring includes a plurality of spacers placed between pairs of bimetal beams.

14. The passive adjustment apparatus as defined in claim 11, wherein the thermally responsive spring includes trimetal beams.

15. A method for adjusting the thermal sensitivity of an axial-motion isolator which supports an object in an equilibrium position relative to a base and includes a support spring for providing stiffness and force supporting capability in an axial direction operatively connected to a negative-stiffness-producing apparatus for producing negative stiffness in the axial direction to allow the support spring and negative-stiffness-producing apparatus combine to produce low axial stiffness to suppress the transmission of vibratory motion between the object and base, the method including:

operatively coupling a thermally responsive element with the isolator, wherein thermal variations acting on the isolator and the thermally responsive element cause the thermally responsive element to apply a restorative force which acts on the isolator to maintain the isolator at or near its equilibrium position.

16. The method of claim 15, wherein the thermally responsive element is operatively coupled with the support spring such that the thermally responsive element is neither compressed nor expanded when the isolator is initially placed in its equilibrium position and there has been no change in temperature from when the isolator was placed in its equilibrium position.

17. The method of claim 15, wherein the thermally responsive element is placed in parallel with the support spring.

18. The method of claim 15, wherein the thermally responsive element is a thermally responsive spring.

19. The method of claim 18, wherein the thermally responsive spring includes bimetal beams or trimetal beams.

20. The method of claim 15, wherein the unconstrained thermally responsive element changes length when subjected to temperature variations.

\* \* \* \* \*